(12) United States Patent
Wenzlau et al.

(10) Patent No.: US 7,831,440 B2
(45) Date of Patent: *Nov. 9, 2010

(54) METHOD AND APPARATUS FOR MONITORING AND RESPONDING TO LAND USE ACTIVITIES

(75) Inventors: Robert Wenzlau, Palo Alto, CA (US); Peter Biffar, Los Altos Hills, CA (US)

(73) Assignee: Terradex, Inc., Palo Alto, CA (US)

( * ) Notice: Subject to any disclaimer, the term of this patent is extended or adjusted under 35 U.S.C. 154(b) by 391 days.

This patent is subject to a terminal disclaimer.

(21) Appl. No.: 12/104,143

(22) Filed: Apr. 16, 2008

(65) Prior Publication Data

US 2008/0255871 A1   Oct. 16, 2008

Related U.S. Application Data

(62) Division of application No. 10/897,545, filed on Jul. 23, 2004.

(60) Provisional application No. 60/489,998, filed on Jul. 24, 2003.

(51) Int. Cl.
*G06Q 10/00* (2006.01)

(52) U.S. Cl. ........................... 705/1.1; 705/7

(58) Field of Classification Search .................. 705/1.1, 705/7

See application file for complete search history.

(56) References Cited

U.S. PATENT DOCUMENTS 6,401,027 B1   6/2002   Xu et al.
6,606,304 B1   8/2003   Grinter et al.

OTHER PUBLICATIONS

Edwards, Amy L.; "The Sleeping Giant Awakes: The Growing Public Debate About Institutional Controls"; Jan. 2001; American Bar Association's Environmental Transactions, Audits and Brownsfields Committee Newlsetter.
"US Environmental Protection Agency Institutional Controls Tracking System"; Oct. 8, 2002; Non-Regulated Industry Focus Group; http://www.epa.gov/superfund/policy/ic/work/fisum.pdf.
"India: Call For Appropriate Data Bases For Land Use"; Jun. 2, 1997; The Hindu.

*Primary Examiner*—Naresh Vig
(74) *Attorney, Agent, or Firm*—Michael A. Glenn; Glenn Patent Group

(57) ABSTRACT

The invention provides a method and apparatus for monitoring the use of land. More specifically, the invention monitors the use of land at a specified site, as well as at adjacent sites. The system continuously receives new land use data, The system identifies land use events at the specified site and filters these monitoring hits against alert criteria. The system then generates alerts to specified parties. Based on these alerts, proactive steps of intervention can be undertaken. The invention answers the question of how to manage risks relating to the use of land resulting from external activities and how to intervene proactively.

19 Claims, 13 Drawing Sheets

 ZONE: PROPERTY MANAGEMENT ZONE
※ LAND ACTIVITY: MLS AND REAL ESTATE
※ ALERT CRITERIA: SALE FOR SELECT APN
※ ALERT: REAL ESTATE
※ FOLLOWUP: ASSURE COVENANT TRANSMITTAL

 ZONE: INTRUSION PROTECTION ZONE
※ LAND ACTIVITY: EXCAVATION NOTIFICATION
※ ALERT CRITERIA: DEPTH > 15 FEET
※ ALERT: ENVIRONMENTAL
※ FOLLOWUP: TRANSFER H&S INFO AS AGENT FOR RP

 ZONE: WATER RESOURCES ZONE
※ LAND ACTIVITY: WATER WELL DEVELOPMENT AND WATER MONITORING REPORTS
※ ALERT CRITERIA: NEW WELL OR NEW CONTAMINATION
※ ALERT: ENVIRONMENTAL
※ FOLLOWUP: VALIDATE WATER WELL LOCATIONS WITH GPS

*FIG. 5*
*(Continued)*

METHOD AND APPARATUS FOR MONITORING AND RESPONDING TO LAND USE ACTIVITIES

CROSS-REFERENCE TO RELATED APPLICATION

This application is a divisional of U.S. patent application Ser. No. 10/897,545 filed Jul. 23, 2004, which claims priority from Provisional Patent Application Ser. No. 60/489,998 filed Jul. 24, 2003, which is incorporated herein by reference in its entirety.

BACKGROUND OF THE INVENTION

1. Technical Field

The invention relates to land use. More particularly, the invention relates to a method and apparatus for monitoring and responding to land use activities.

2. Description of the Prior Art

Any land based property, e.g. land, a building, an apartment, a commercial structure, which may include such resources as a water well, is not only an asset but also potentially a liability. The liability attendant with such a property is typically attributable to any pollution in the ground, any noise or air pollution related to the property, or any potentially dangerous use of the property. Therefore, the owner (or sometimes the user, such as tenant) of a property needs to protect his asset and manage such liability to optimize the net sales value or use value of the property (see FIG. 1, which is a graphic representation of the asset and liability aspects of real property).

The difficulty of managing land based assets and liabilities is that they exist in a dynamic environment with constant changes and outside influences (see FIG. 2, which is a graphic representation of the potential economic risks and losses associated with real property).

Events External to Site

Today more than ever, it is important to monitor events occurring in the vicinity of a site. These external events or activities can be of many different kinds, such as set forth in FIG. 2, but they not limited to such activities. For example, a change in zoning law can increase or decrease the land based property by either expanding or limiting the future use of the property. A change in traffic can also increase or decrease the property's value. In the case of a residential area the impact of a traffic pattern change is negative; in a retail environment certain kinds of traffic increase can be very positive for the use value and therefore value of the property.

In the event of underground pollution there is a serious liability related to the property. Often, even after a polluted site has been cleaned up, there remains some amount of residual contamination left in the ground because today's technology and/or exorbitant costs do not allow a complete clean-up. Furthermore, often the pollution is not limited to the site, but extends underground to neighboring areas.

Pollution is not limited to underground pollution. It could be, for example, air pollution or noise, which travels outside of the boundaries of a property. In the above cases, a property owner is often not only liable for the pollution attributable to the site owned, but also for it's outside reach, even though the owner has no control over such area. If today someone uses the land inappropriately the likely damages caused by the property owner increase. For example, there are an estimated 250,000 to 400,000 active and former gas stations in the U.S., where no more than 125,000 of those are actually active current gas stations. Gas stations are notoriously underground polluters.

There is an additional important element of complexity, i.e. the pollution is often underground and is not limited to the boundary of land ownership. The plume of such pollution often reaches into neighboring properties and public roadways. Most of current and former gas stations, for example, have such underground pollution extending outside of the property boundaries, the plume (area) of which in most cases extends to outside of the property. For example, consider a day care center being built on a property in the vicinity of a current or former gas station, where the plume extends under that property. Years later it becomes evident that the gases released from the plume have caused a health damage to the people using the day care center. Without question, the gas station owner is liable for the damage, which now extends to millions of dollars in legal costs, damages, and possible penalties. In this example, the wrong land use in the vicinity of the property has caused huge damage in liability costs to the property owner. This damage could have been easily averted if the property owner had been made aware during the planning stage that a day care center is being planned at the site. In that event the property owner could have taken a range of actions, such as alerting the city planning department and asking them to revoke the building permit, providing an incentive to the owner of the property for the planned day care center to find a different site, or finding a safer use for the property, such as a commercial building with appropriate engineering barriers, or a parking garage, etc.

Events Internal to Site

It is also important to monitor activities occurring at the site. This is important for reasons such as unauthorized access and protection against fire and other emergencies. However, there is a new element and that is to monitor the land use at the site.

The land use can be restricted in a number of ways, such as:

Local and regional zoning restrictions;

Deed restrictions, i.e. restrictions which are documented in the deed of land; and Institutional controls (for a definition, see below).

This is often necessary because not all the pollution can be removed. Such limits, for example, specify that the land can be used for certain types of commercial use, but not for residential development, or that none of the ground can be removed or dug into.

Many institutional controls have been implemented over the past 3-5 years. However, to date there is no method to monitor the enforcement of such controls.

PRIOR ART

Today, there are many tools that may be used to manage events internal to the site, i.e. any activities not related to external influences. These tools include fire or smoke detectors, heat and motion sensors, video cameras, groundwater and other sampling methods, and similar tools. For example, a fire or security alarm system alarm monitors the internal events and determines, for example, "Is there any smoke or fire?" or "Is there an intruder physically at the site trying to enter the building or property or certain areas within the property?" The person monitoring the cameras or data collection with respect to these alarm systems may or may not be located at the site.

These methods have in common that they detect a physical change or element, such as chemicals in the air or physical objects moving in the vicinity. These methods do not address the issue of how the land is being used, nor how the adjacent land is being used. Furthermore, while today's tools may detect the presence of something, they can not detect future or intended events. Finally, none of today's methods of monitoring are linked to a fixed geographic area or space.

Groundwater and soil sampling is the method currently used by environmental regulators. Monitoring wells from which samples are taken quarterly are installed at and around a polluted site. The results provide information of whether the contamination has changed at that well. The regulator deducts from a series of sampling results if there are any positive or negative changes. The nature of quarterly sampling has many shortcomings, including:

The sample is always post event or reactive. For example, the sample picks up that the contamination has moved underground. The sample can never be proactive, i.e. detect that an event is about to happen, such as construction de-watering which can cause changes in ground water patterns, which in turn shift or move the contamination plume. Therefore, knowing about planned construction and construction method could proactively avoid an underground movement of the pollution;

The sample provides no information of the events above ground. Sampling can never detect a change in land use, such as the opening of a school, nor could it detect trenching work, such as building a new sewer line through the contamination, possibly exposing workers to unsafe conditions.

Geographic information, e.g. street address, longitude/latitude data, displayed on maps is also widely used. The most common use is of online maps, such as driving directions. Earlier versions showed a property location marked with a marker, which is typically positioned at the center of the geographic property. More advanced versions show the actual or estimated shape of the property location. More sophisticated tools include, for example, a store locator. Other methods include overlays, where a certain characteristic, such as micro-climate, is imaged as a shape on top of a map.

Land use at a site is today regulated by the local/municipal and government permitting process, as well as local, state and federal agencies. To some extent it is monitored after the permit has been issued by building and other inspectors.

There are no known and effective methods of tracking institutional controls. The EPA states in a draft paper " . . . proper implementation, monitoring, and enforcement is essential to the effectiveness of the IC . . . . Draft Guide" (*Institutional Controls: A Guide to Implementing, Monitoring, and Enforcing Institutional Controls*, February 2003). This paper identifies the need for monitoring, but does not mention any method or procedure for accomplishing such monitoring.

Currently bills concerning land reuse and revitalization are in the legislative process in California (California Land Reuse and Revitalization Act of 2004), other states, and on Federal level. These bills establish the legal framework to facilitate the redevelopment of about 600,000 brownfields in the U.S. These bills typically include an appropriate care requirement which provides that the new user of the brownfield must be in compliance with land use controls established with respect to the use of the site. There is currently no method in operation to satisfy this requirement.

It would be advantageous to provide a method and apparatus for monitoring and responding to land use activities.

SUMMARY OF THE INVENTION

The invention provides a method and apparatus for monitoring the use of land. More specifically, the invention monitors the use of land at a specified site, as well as at adjacent sites. The system continuously receives new land use data, The system identifies land use events at the specified site and filters these monitoring hits against alert criteria. The system then generates alerts to specified parties. Based on these alerts, proactive steps of intervention can be undertaken. The invention answers the question of how to manage risks relating to the use of land resulting from external activities and how to intervene proactively.

DETAILED DESCRIPTION OF THE INVENTION

Figure 1:
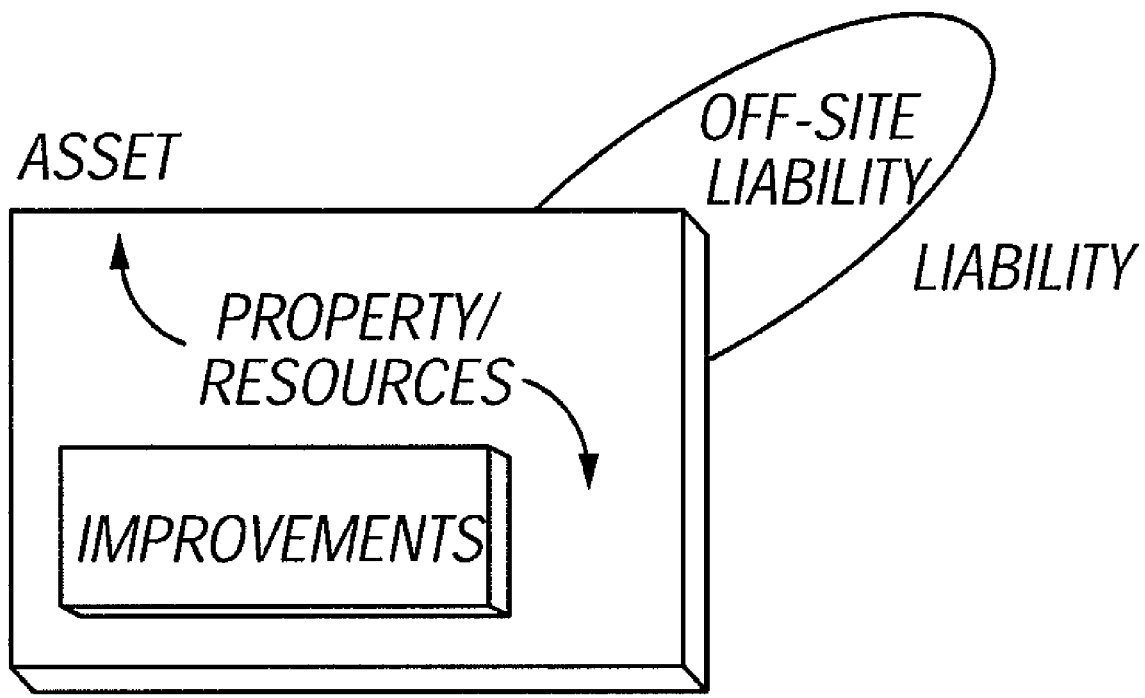
FIG. 1 is a graphic representation of the asset and liability aspects of real property.
Figure 2:
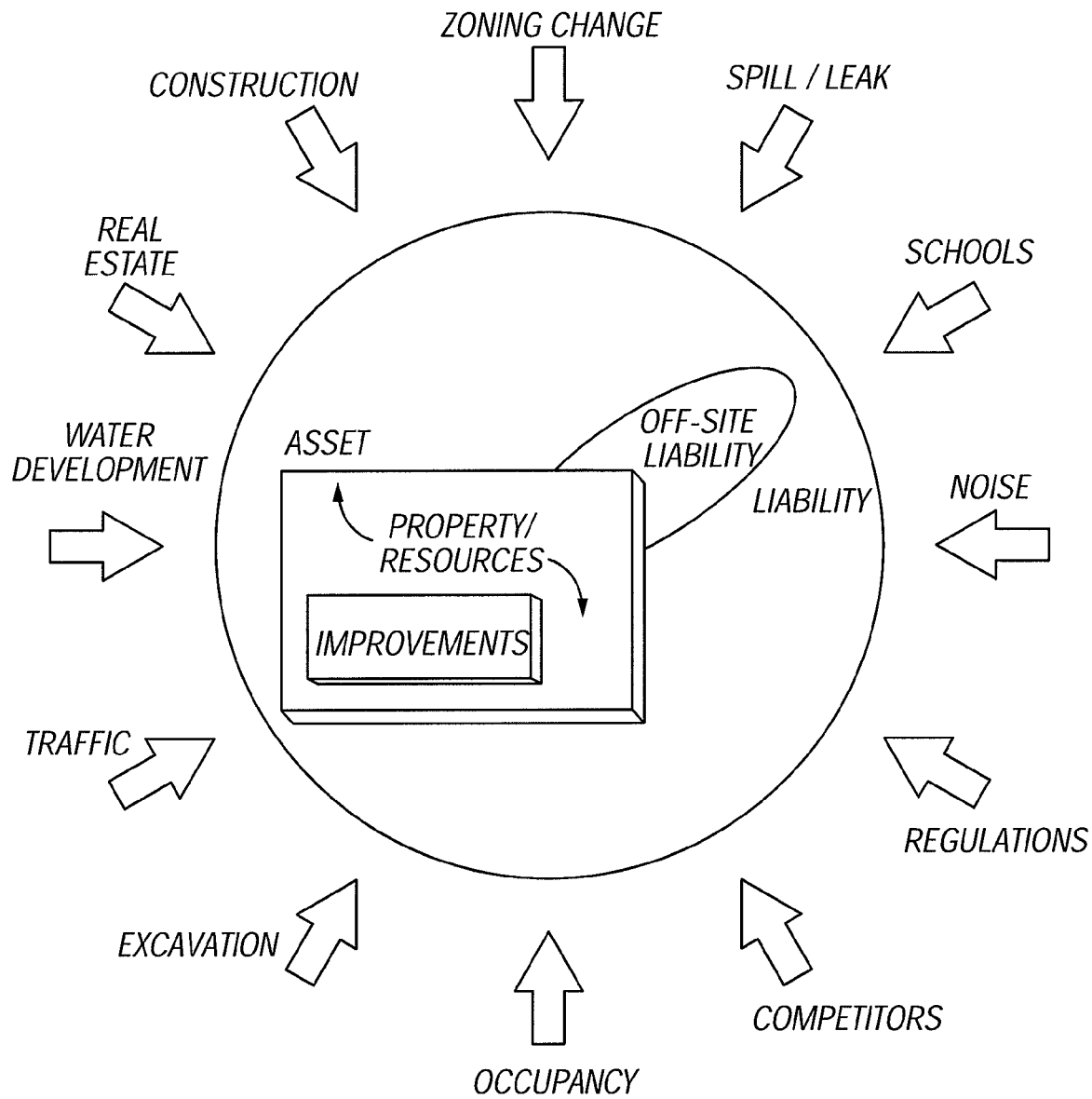
FIG. 2 is a graphic representation of the potential economic risks and losses associated with real property.
Figure 3:
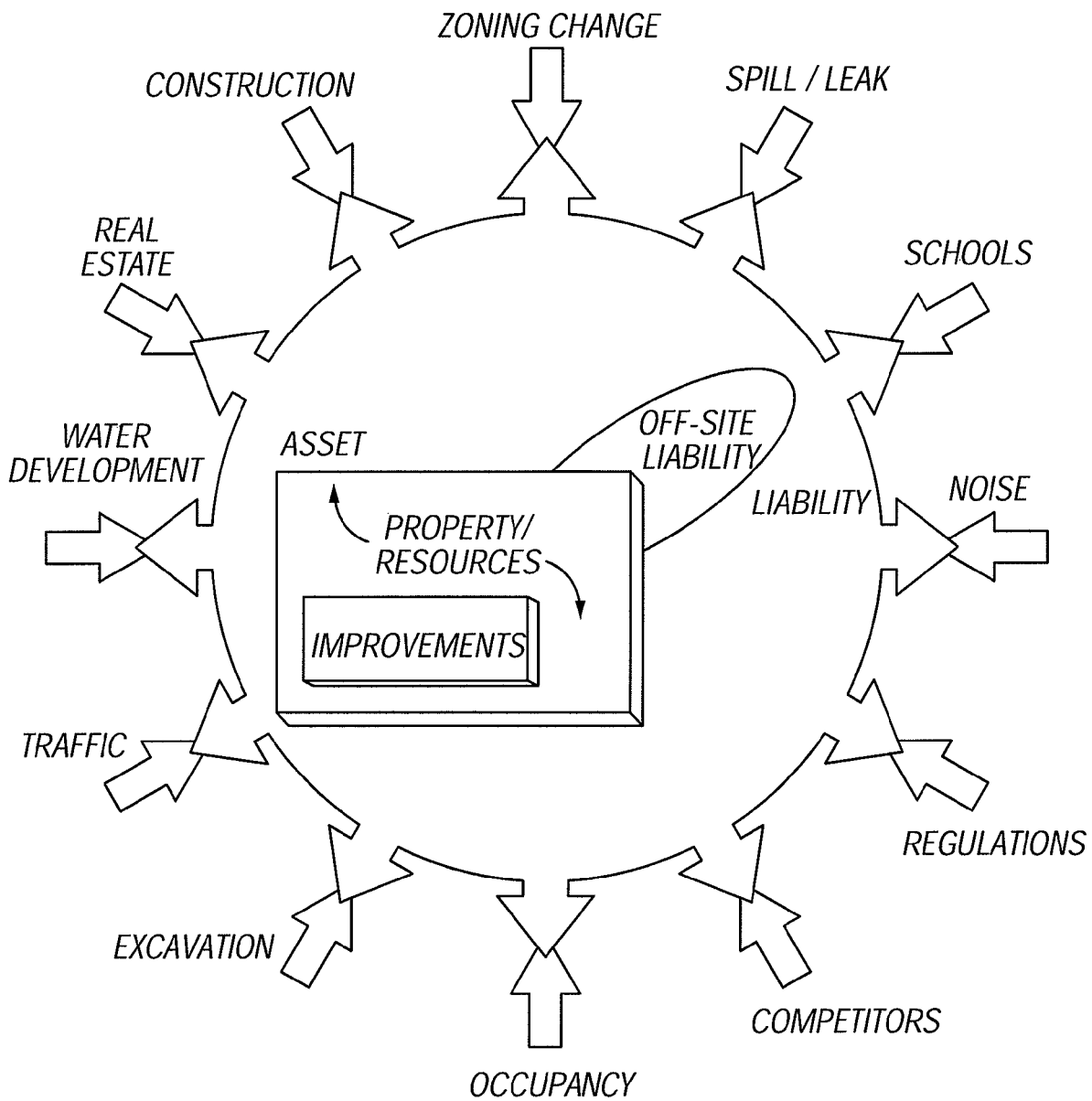
FIG. 3 is a graphic representation of a method and apparatus for monitoring the use of land according to the invention.

The invention provides a method and apparatus for monitoring the use of land. More specifically, the invention monitors the use of land at a specified site, as well as at adjacent sites. The system continuously receives new land use data, The system identifies land use events at the specified site and filters these monitoring hits against alert criteria. The system then generates alerts to specified parties. Based on these alerts, proactive steps of intervention can be undertaken. The invention answers the question of how to manage risks relating to the use of land resulting from external activities and how to intervene proactively. This is illustrated graphically in FIG. 3.

Definition of Terms Used

The following definitions shall apply in connection with the discussion herein:

Site: A specific geographic area of any size, typically as small as a residential parcel of land, or as large as an airport or even a national park. The definition of a site is also used in an expanded manner, such as the area along an infrastructure, such as a pipeline or a street. Such a site can include the area taken up by the infrastructure plus an area of a certain width to either side of the infrastructure. The boundaries of a site do not need to align with the boundaries of the legal description of a property, such as boundaries of a parcel. Sites may have three dimensions, which include width, length, and height or depth, as well as four dimensions, e.g. time varying aspects of the site may be considered.

Land Use: Land use comprises any way of using the land of a site which can be, for example, a residential home, day care, commercial use, agricultural use, mining of resources of any kind, use of water (water well), use as airport, or any other activity performed on, under, or above the land.

Institutional Control This is a new class of land use restriction. If a site has been polluted by a responsible party (the polluter), the responsible party, the local government, other agencies, and other parties such as a developer can reach an agreement, which specifies the degree to which the land needs to be cleaned up, as well as land use controls, called institutional controls. These institutional controls limit how the land can be used. This is often necessary because not all the pollution can be removed. Such limits for example specify that the land can be used for certain types of commercial use, but that it is not fit for residential development, or that none of the ground can be removed or dug into. The institutional control can also require certain engineering controls to be in place, which are physical building and engineering requirements and which can include, for example, physical monitoring equipment, requirements that the surfaces need to be built upon in a certain manner, or that water or vapor, for example, can or can not penetrate or escape.

There are at least two types of institutional control, to whit:

Soft Institutional Controls: These controls are self-imposed by a responsible party, and typically are not required by any regulatory or government agency Hard Institutional Controls: These are institutional controls that are imposed by a third party who is not the owner, user, and/or polluter of the site.

Discussion

The presently preferred embodiment of the invention comprises a database containing the Site description data of the site to be monitored:

This description can be as simple as the location of the site, whereas the location can be described in any manner, from longitude/latitude parameters, parcel number, street address, grid based mapping location, and/or altitude, elevation, or depth.

Additional information can include:

A detailed description of elements of interest, such as the pollution;

A graphical description, e.g. an outline of the location of the pollution;

Contact names and addresses;

A description of the institutional controls.

In addition the description can include one or multiple zones, where a different monitoring and alert procedure can be provided for each zone.

The description may also include pictures or other visual elements.

The zones or other above information can be visualized, e.g. drawn on a two- or multi-dimensional map.

The invention further comprises a database which includes the IC Rules data (Institutional Control Rules). These IC rules describe the restriction and alert procedures such as, but not limited to:

Different restrictions specified for each zone, established above;

The elements and frequency of monitoring the land use; and

The rules for alerting one or multiple parties regarding any violations or conflicts with the The system includes a database containing land use activity data. This data can either be generated by the system or provided by third parties. This data comprises any kind of data which can be related to a geographic location of the site, and varies between different locations. For example, the school zone, Congressional district, micro-climate in the area of the site, vicinity of other sites, such as a store, any crime statistics in neighborhood.

These data include, but are not limited to, such data as:

Any kind of real estate data, e.g. sales, zoning, current use, tenant, rent rates;

Water well related data;

Building permit data or application data;

EPA data;

Requests for excavation, as well as excavation permits;

Any other land use related data;

Chemical spill data;

School, education data;

Political representation data;

Traffic data;

Socio demographic data, e.g. income, age, race, education;

Commercial data, e.g. type of business, sales, industry;

Crime rates, sex offender data;

Noise, air, climate data;

Health data, death rates and causes; and

Real time data provided by sensors, e.g. motion sensors, release of gas sensors, video camera. Sensors herein are defined as any device capturing real time physical activities or events.

Furthermore, in an extension, the activity data may not already exist as data, but may need in an additional step to be generated using other data and/or other activity data sets and logic rules.

In a further extension, the data may need to be collected using physical measuring instruments or other tools.

The system includes a logic module, which monitors the land use according to the IC rules using the activity data. The logic module assembles the data of the site in question into a shape file, which expands across a specific geographic area. The system then translates the activity data into a shape file with its specific geographic area, e.g. two-dimensional area of longitude and latitude, it may occupy at a short or long moment of time. The system then compares the two geographic areas to each other to determine and search for any area overlaps. If there is an overlap, the system logic module prepares and sends an alert.

Further extensions of the logic module include:

The shape area can be a three-dimensional shape, e.g. longitude, latitude and altitude;

The shape can be two-dimensional, where one dimension is altitude, elevation, or depth;

Shapes can be virtual, such as for example local demographics, which might be expressed as income per household and linked to geography via the description of the ZIP code, outline of school district, street blocks, or other such identifier, describing characteristics;

Shapes can be of any size, e.g. they could be on the level of atoms or cosmic scale;

The shapes can have time as an additional fourth dimension;

The system can compare multiple shapes against each other to search for any type of overlaps, e.g. simple or multiple overlaps;

The shapes can be dynamic, and change according to logical rules, such as:
Change in size; and/or
Change in location;
A person or object could be a shape owning a geographic location for some moments in time;
Shapes can merge and split apart;
Alerts can be of any electronic or printed format, such as email, voicemail, fax, certified mail, etc.;
One or multiple parties can be alerted;
There can be additional logic rules outlining an escalation path for the alert mechanism;
An alert can be driven or initiated based on a specified time sequence of events;
The alert logic module includes simple or extensive steps to verify the alert, such as for example:
Check against other data sources to check plausibility or seriousness;
Request from one or more systems additional information needed for evaluation; and/or
To include manual operator input.

In a further extension, the system may include another logic module, referred to as an action module. This module receives the alert and creates corrective action steps based on the alert. A corrective action is any activity, which is not an alert or an evaluation of an alert. It can be an automated letter of complaint, a warning to the party having caused the alert to stop certain activities or introduce activities. For example, the letter might demand a polluting company to stop certain emissions. It may be a legal disclosure letter to the purchaser of the property next to the site, to make sure that the new owner is aware of certain land use restrictions.

In further embodiments:
The data may be distributed among systems, which may be networked together via the Internet or other methods;
The logic module and action module may be physically the same hardware; and
The logic and or action module tasks may be done by multiple modules and/or systems, which may be distributed, and may interact over the Internet.

Architecture

A currently preferred embodiment of the architecture of the invention is outlined below.
The system comprises the following:
A database to store:
Sites and their characteristics;
Logic rules;
Output data (history);
Administration data, user password and other such information;
User interfaces for data input:
Which is a Web based interface and associated screens;
User controls to upload information;
A system to system link, such as XML technology; and
A mobile computer unit;
A processor for applying the logic to the data, do computing (today typically done by an application server);
A processor to present the output, (today typically done by a Web server) and to present the output;
Output interfaces, such as:
Web based interface to see results;
User controls to output data, results;
Distribute the results electronically, e.g. email, computer to computer, computer to fax or other output devices;
System to system link using the XML technology; and
A remote, mobile unit.

This architecture can be on the same physical computer, or it can be multi-tier and be distributed across a network of computers, each performing some of the tasks.

Additional Applications of the Invention

In an alternative embodiment of the invention, the user can interact and use the system over the Internet. However, the user does not need to do so. All interaction between the system to provide data, receive alerts, and/or corrective actions can be delivered via multiple other methods.

In another embodiment of the invention, the activity data reside outside of the system, and the system logic comprises a procedure to query another system, e.g. via a network such as the Internet, to get the data.

In another embodiment of the invention, the logic rules are distributed among multiple systems and computers, such as in the implementation of the invention in the form of a Web service.

The invention is especially powerful if a historic sequence of events is analyzed. The logic module includes rules which allow the detection of patterns over time. These patterns are used to predict events before they happen. For example, if the historic records show that the zoning has changed, and then a neighboring property is offered for sale, and that the sale has occurred, this might indicate that a new owner may change the use of the adjacent property, which might include construction.

In a further embodiment of the invention, the system can also be used to predict certain other events before they occur, i.e. the logic rules can include the evaluation of additional data, such as the age of the property sold, the economic trends in the neighborhood, and other data points. For example, if the property purchased is over 30 years old, and if in general the area is in a phase of redevelopment, then there is a relatively high certainty that the new owner may demolish the existing structure and rebuild.

In a further embodiment, the system can be expanded to be used in the context of a planning process. For example, a city planner can use the system to proactively learn about IC Controls and thus use the system for better planning process.

DETAILED DESCRIPTION OF INVENTION AS APPLIED TO MONITORING OF LAND USE

Figure 4:
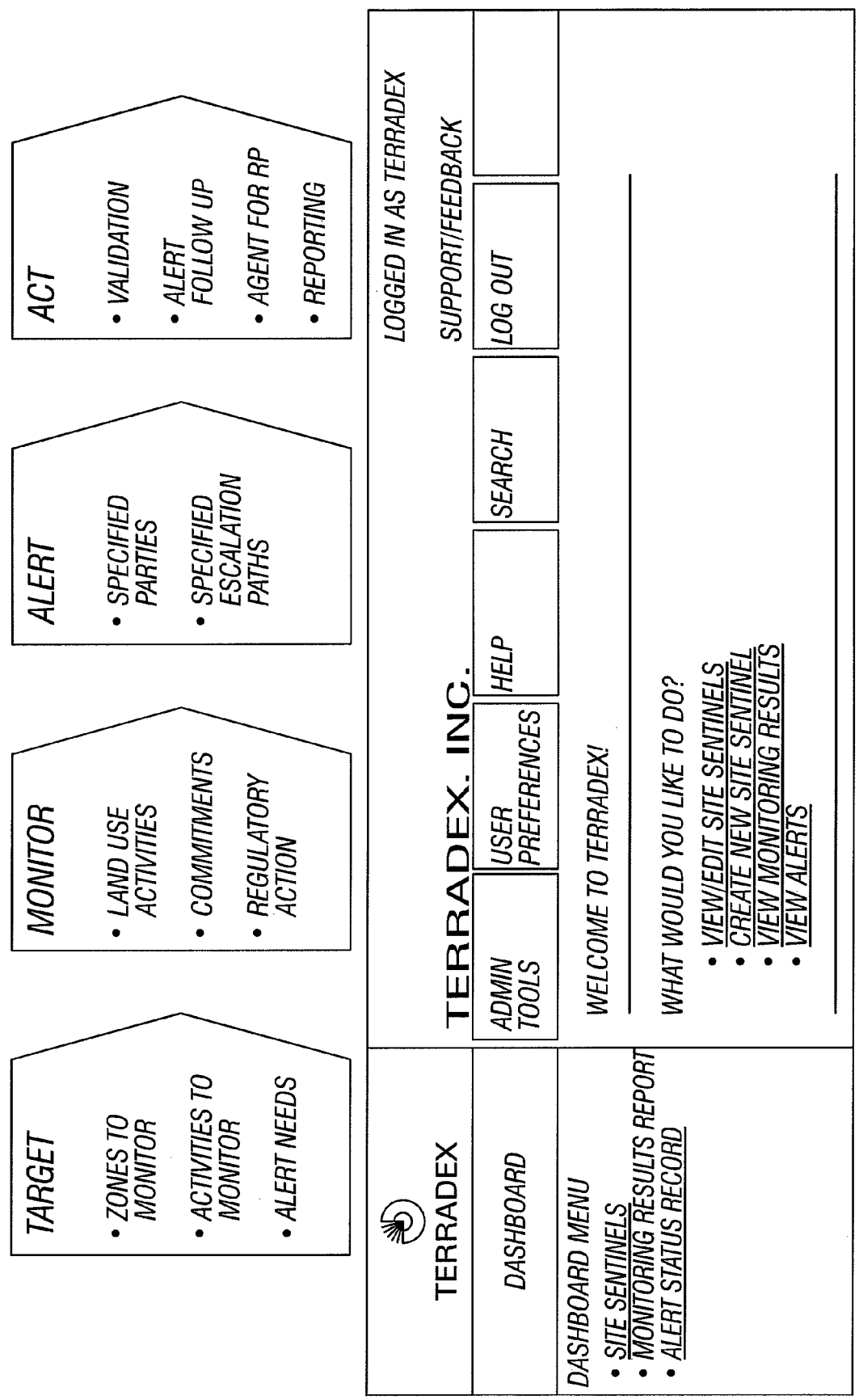
FIG. 4 is a block schematic diagram showing four basic steps employed in a method according to the invention.
Figure 5:
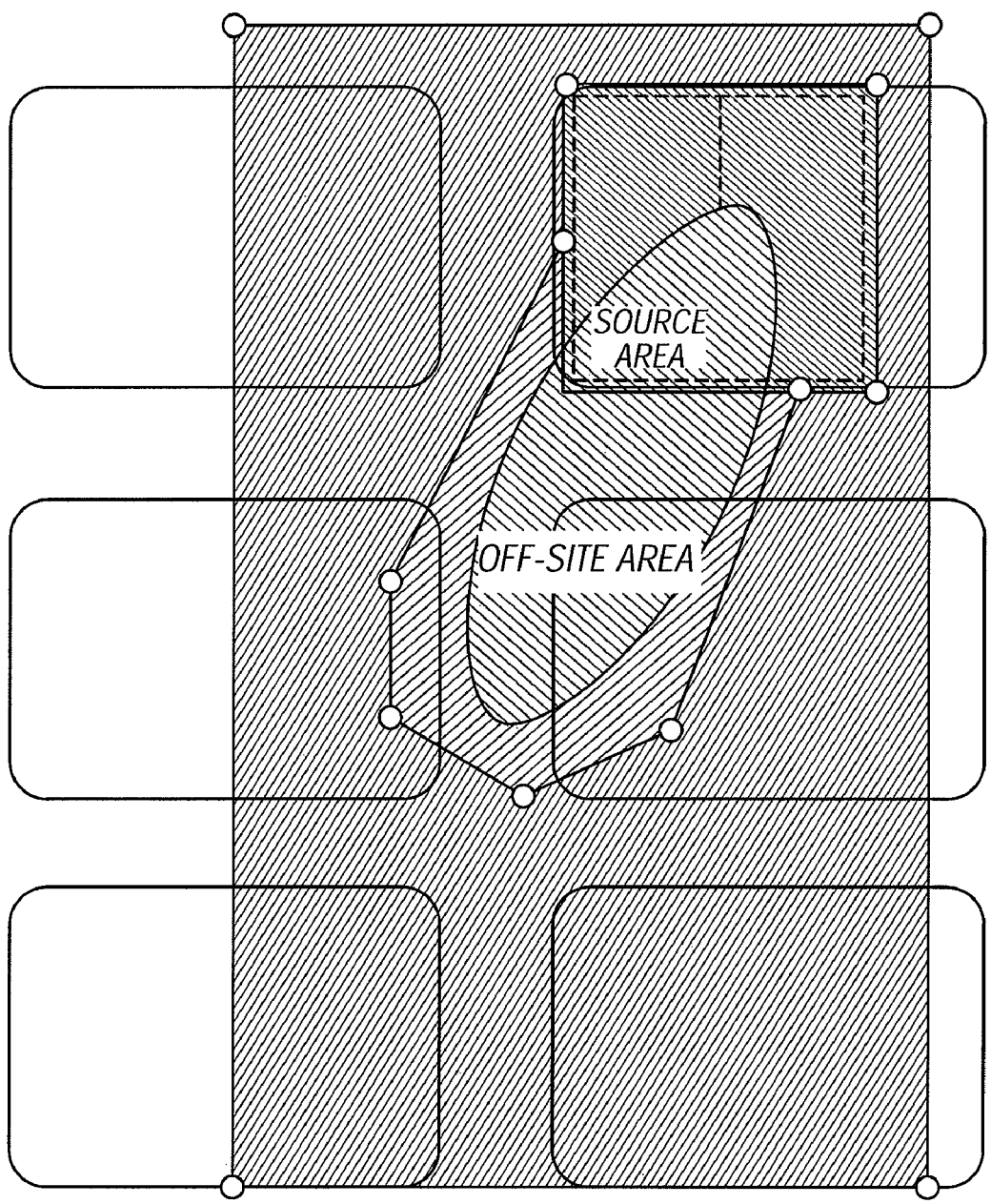
FIG. 5 is a block schematic diagram showing a targeting step according to the invention.

One example of the application of the invention is in the area of environmental land use control. Such an application consists typically of four steps: target, monitor, alert, and act. FIG. 4 is a block schematic diagram showing the four basic steps employed in a method according to the invention 1. Target FIG. 5 is a block schematic diagram showing a targeting step according to the invention.

The site to be monitored is entered into the system. This can be done manually over the user interface or automatically by uploading the data.

The site to be monitored in the system is set up in the system. The site must be described in geographic terms which can be, for example, a street address and street intersection, a parcel number, longitude and latitude, a grid map, such as Thompson Brother Map, GPS data entry, for example by walking around the site with a GPS tool, and adding GPS points, or other type a geographic identification data, which allows the site to be located geographically.

The site can be described by one or multiple zones, each description being a zone. The zone description can be simple, e.g. circle of 0.1 mile diameter, or a complex shape with exact GPS data points, as shown in FIG. 5.

In addition to setting up the zone or zones the user can specify, for example:
What data sources need to be monitored against such zone;
The alert criteria for each zone and or data. The alert criteria can be simple, e.g. a one sentence statement. The alert criteria can also specify the alert path, who needs to be informed first, second, and so on, based on which event and when. These alert criteria can include soft or hard institutional controls or in essence are the representation of institutional controls in the system;
Follow up or act, what action the system or system operator should take to follow up on the alert.

This set up is typically done once and updated over time if need be. The targeting can contain additional information, which could be extensive environmental reports and data about the site.

The data entry can also be achieved by default parameters, allowing one to enter a great number of sites, or sites where little information is available at the time of data entry.

2. Monitor

Figure 6:
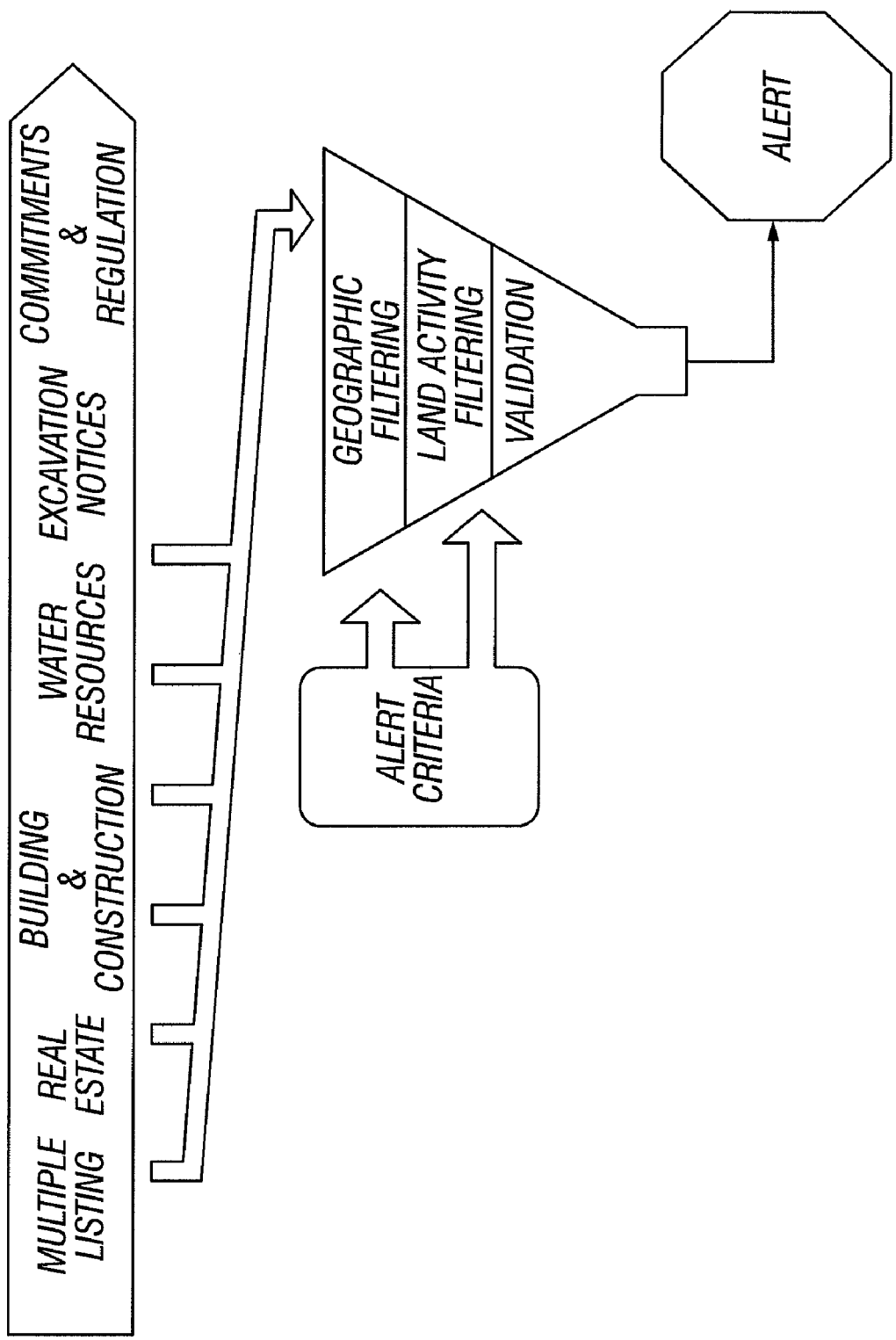
FIG. 6 is a block schematic diagram showing monitoring, filtering, and validation of land use data according to the invention.

FIG. 6 is a block schematic diagram showing monitoring, filtering, and validation of land use data according to the invention This second step is an ongoing activity as the system receives new data about land-use activities, such as in this example real estate data or excavation notices, e.g. a utility company is a replacing sewer pipe, and other data.

These data of events need a geographic description of where the event is about to occur, such as excavation notices which are received typically 24 hours before the event, or has occurred such as a real estate sale or building permit issue). This description can be of one or multiple types (same as zoning).

The system then checks the geography of the event against the geography of the zone. It does nothing if the event does not overlap with one or multiple zones.

If it does overlay, the system notes the overlap in a monitoring report, a sample of which can look like the background of FIG. 6.

The report shows the address or identifier of the site, the address of the event, and possibly a short description, providing more detail of the event.

Figure 7:
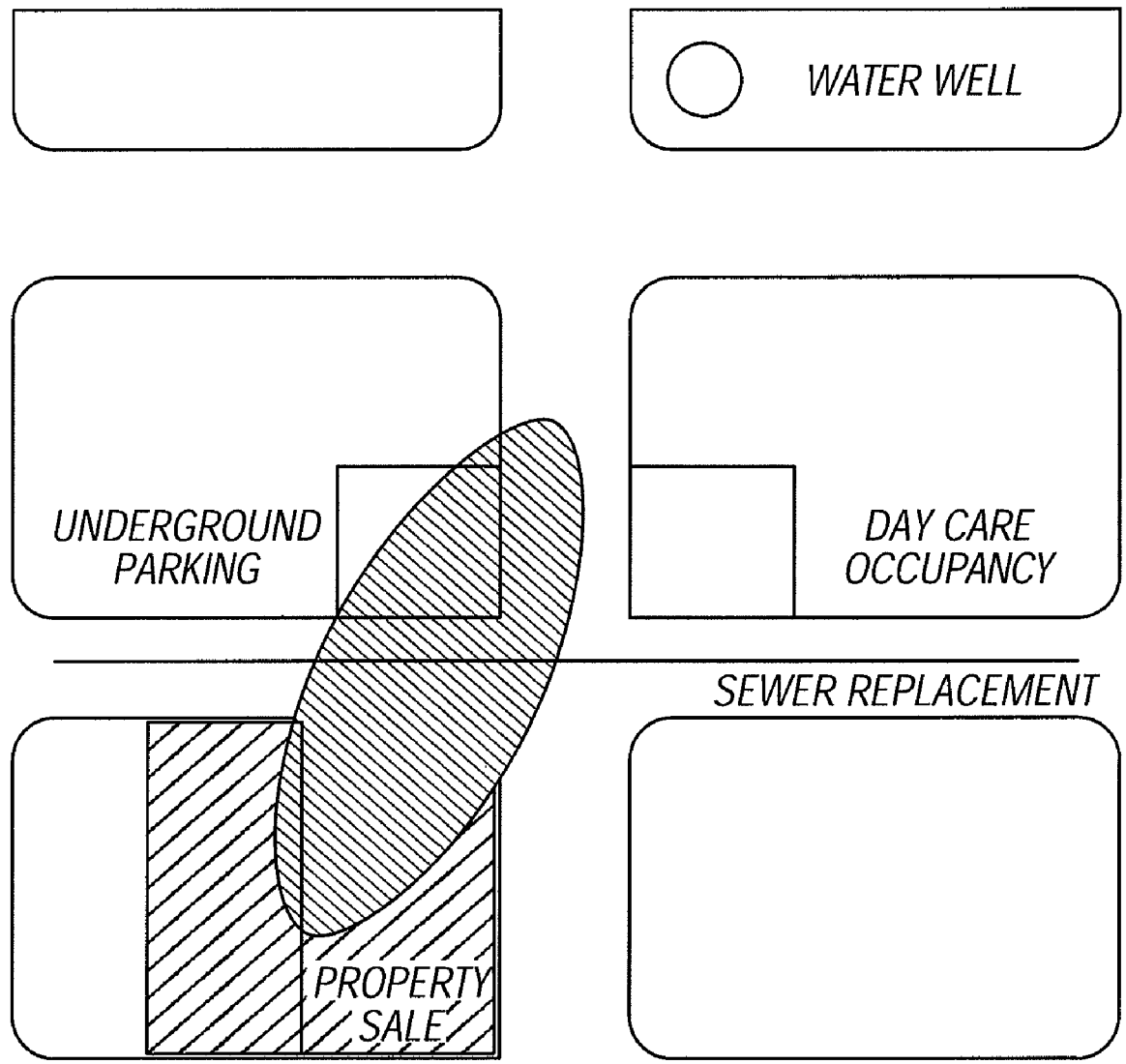
FIG. 7 is a block schematic diagram showing events detected according to the invention.

The report can also be a geographic representation as shown in FIG. 7. This representation shows the site and the events. It could be graphic as shown in FIG. 7, it could be shown as a map, or it could also include an aerial picture.

3. Alert

Figure 8:
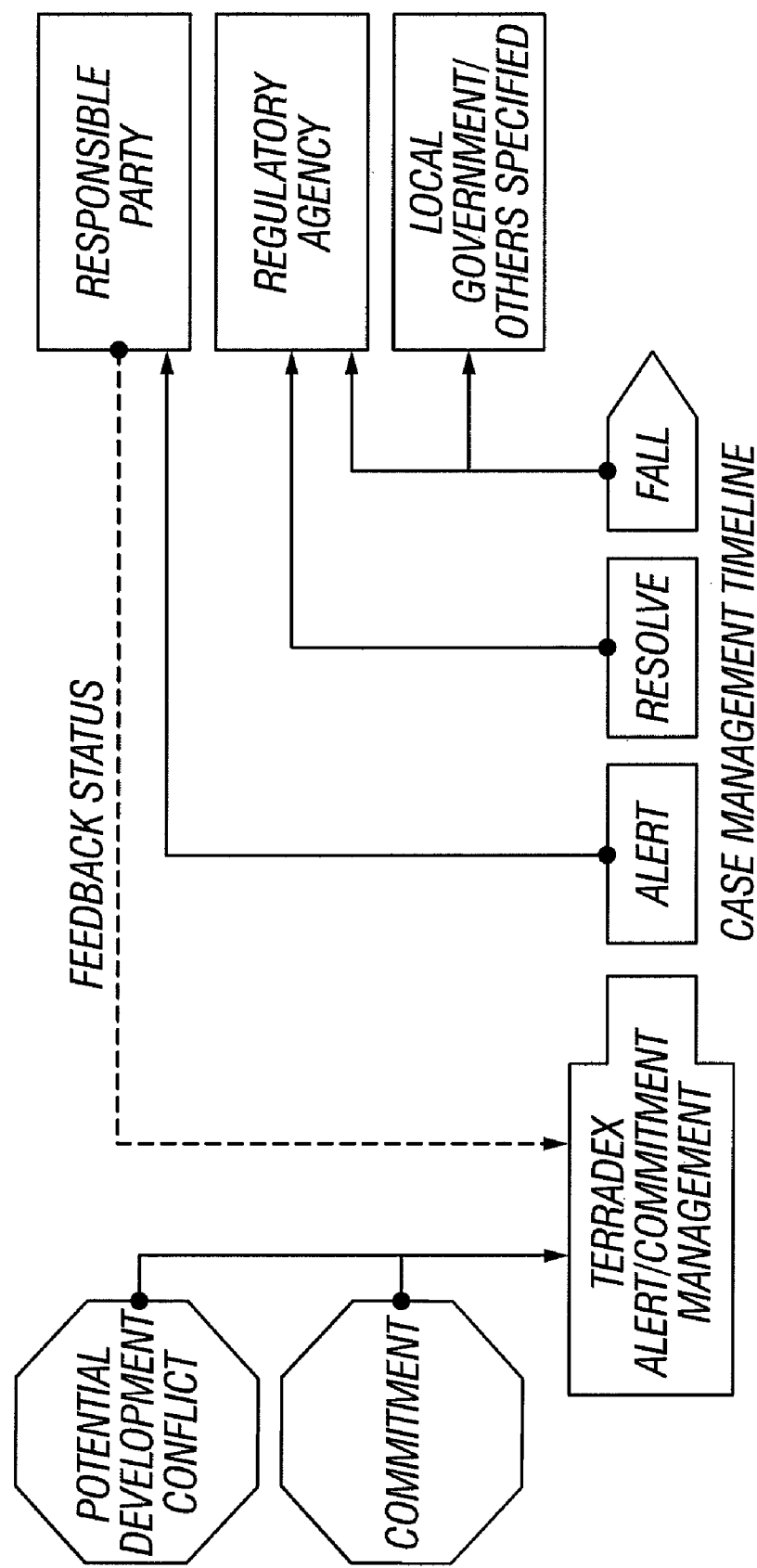
FIG. 8 is a block schematic diagram showing alerts procedures, customized to requirements according to the invention.

FIG. 8 is a block schematic diagram showing alerts procedures, customized to requirements according to the invention.

In this third step the monitoring report, which is basically a hit report, indicates that there is an event within a zone. However, the event might not be cause for alarm. The alert does filter the monitoring hits against the alert criteria. Only if there is a fit is an alert created.

For example, if the plume (pollution area) shown in FIG. 7 is twenty feet under ground, and the sewer replacement is only eight feet deep, then there is no cause to send an alert because the event is not critical. However, if the plume is four feet underground, there is great safety and health concern for the excavation worker and an alert needs to be sent to the persons or systems as specified in the alert criteria in step 1 above.

This review of the monitoring results against the alert criteria can be done manually, i.e. a person does the review and uses the system to create the alert by an interface. It could also be done by the logic of the system, or in a split fashion, where the system does some review along basic rules and the human expert does others. The same approach can be used with the sending of alerts, which could be done by system, manually, or in a combination thereof.

The alert can be sent to the user via email, or output to other devices, such as a fax system, This is push method, pushing the alert to the user, responsible party, or whoever needs to receive the alert. The user can also go to the system and see the alert there, which is the often less effective pull method.

Figure 9:
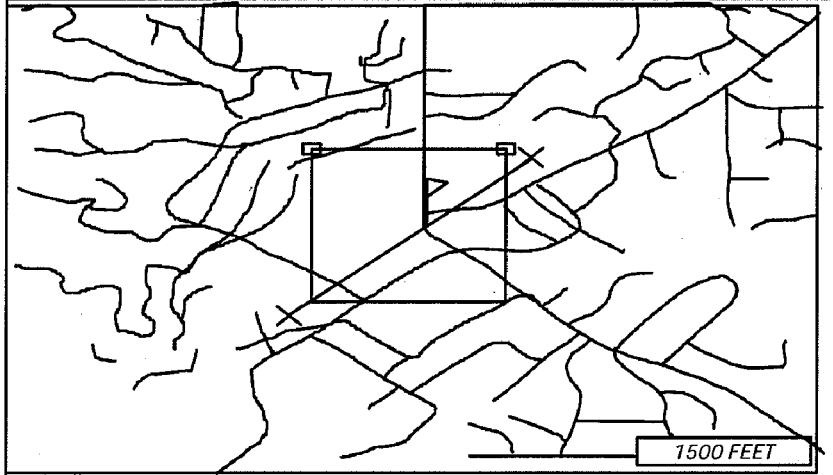
FIG. 9 is a block schematic diagram showing an act step, in particular support: alert response management, according to the invention.
Figure 9:
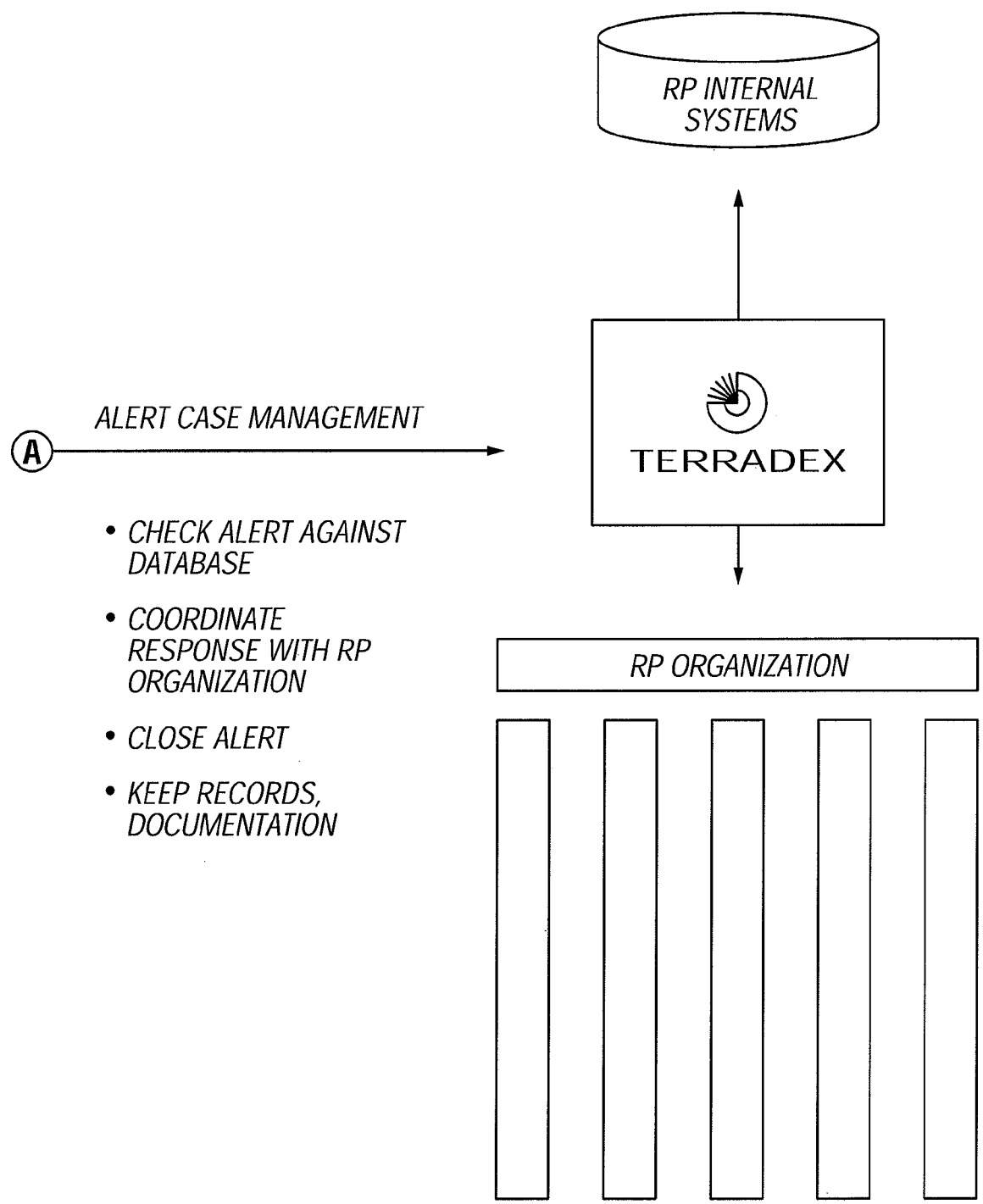

FIG. 9, on the left hand, shows an alert. There is a map of the site and event, a brief description of the site, and the event, as well as a summary of actions taken in response to the alert. This action summary is updated as new actions are done and recorded in the system. This is just one example of the representation of the alert.

4. Act

FIG. 9 is a block schematic diagram showing an act step, in particular support: alert response management, according to the invention.

Steps 1. to 3. discussed above are key to the invention. Step 4 can have multiple forms and is a logic extension.

For example, the system can contain a case management tool, which assures that no alert is dropped, thus forcing the system user and operator to monitor the alert action and make sure something happens.

Often for large complex companies it is important to coordinate the response and actions. The system could provide the basis for such steps, which would be case management or project tools.

Figure 10:
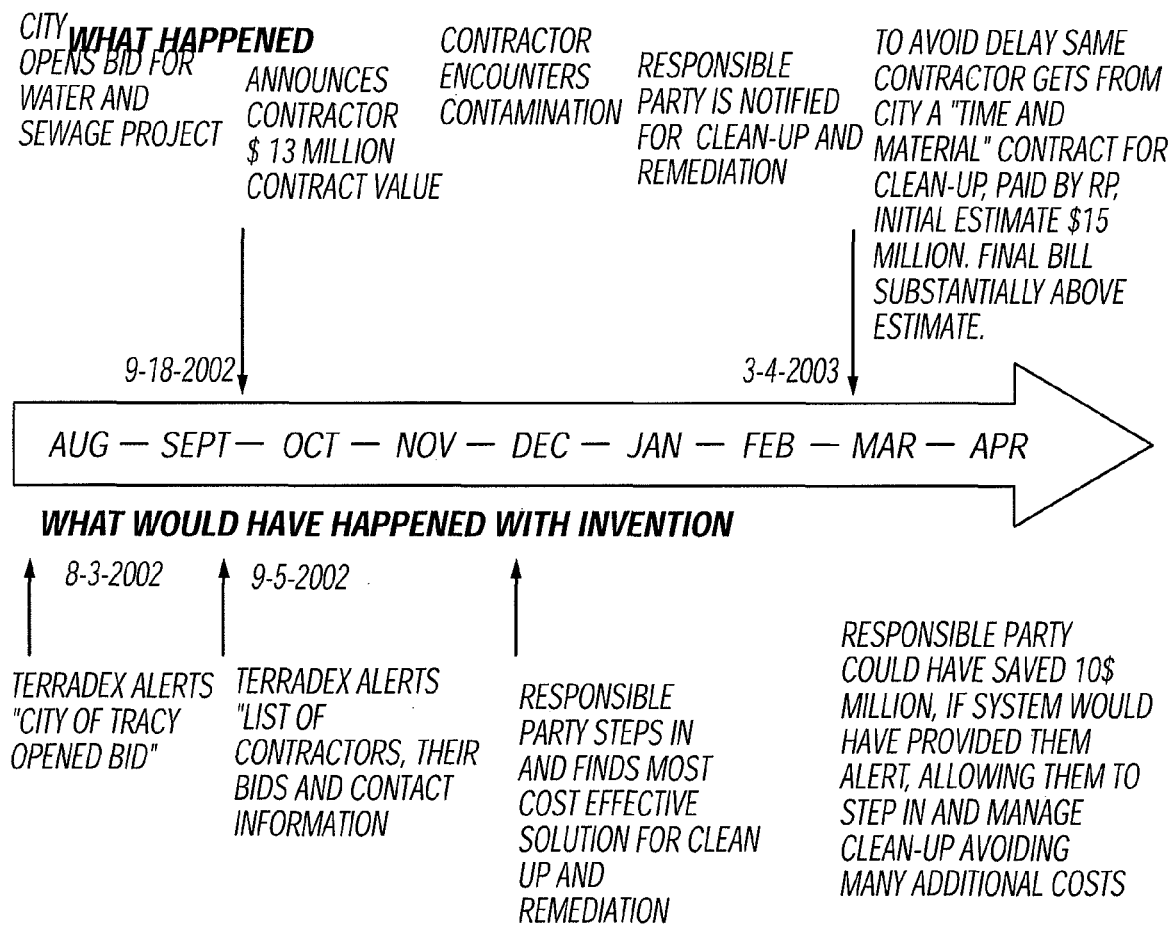
FIG. 10 is a block schematic diagram showing an example of a Tracy, Calif. sewer project according to the invention.
Figure 11:
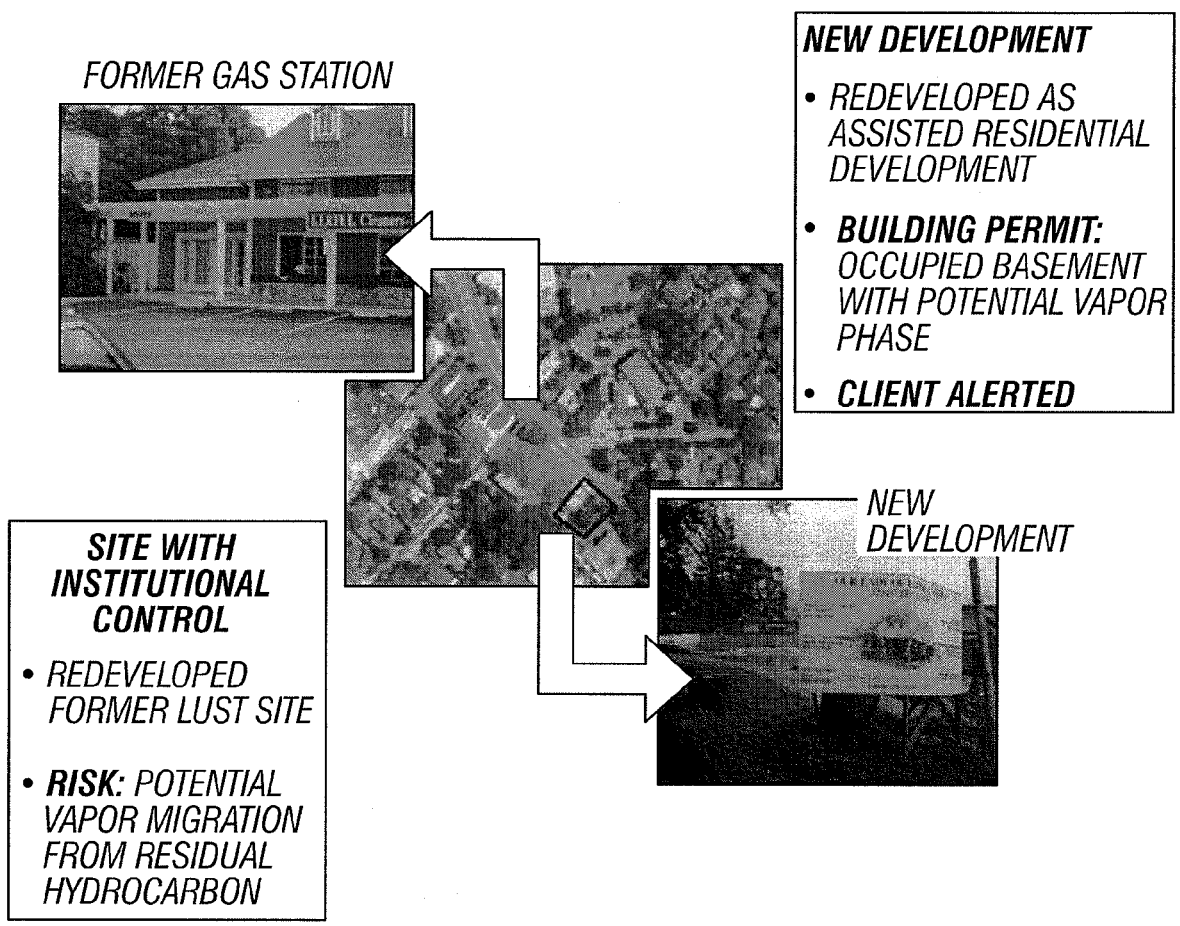
FIG. 11 is a block schematic diagram showing an example of a Saratoga, Calif. redevelopment and related activities according to the invention.

FIGS. 10 and 11 show examples of how a system as outlined in this invention would have detected such activities. In particular, FIG. 10 is a block schematic diagram showing an example of a Tracy, Calif. sewer project according to the invention; and FIG. 11 is a block schematic diagram showing an example of a Saratoga, Calif. redevelopment and related activities according to the invention.

Other Applications of the Invention

The invention is not limited to managing polluted sites as is outlined herein.

The invention is not limited to longer term monitoring, such as watching a site for months or decades. The invention could also be applied to short term sites of interest, such as for utility construction. In this example the utility company uses the system to plan and execute its work. The geographic area targeted in this example is the area along and around the planned utility trenching work. Once the work is completed, such as when a new sewer system is built, the site is taken again out of the system.

Further, the geographic area zone could be smaller and changing over time. For example, the area could be the dimensions of a car or truck, changing its geographic position as and when it moves. Furthermore, it could include not only the actual, real time position of the zone, but describe a planned move, such as the route where the vehicle plans to go. In other words, the zone of travel is the land use for a short time period. For example, planning the route of a truck containing hazardous materials can identify where the land use of the road for the materials might not be appropriate or very risky with respect to the other land uses of that road or around the road, and consequently an alternative route should be selected. For example, it might not be appropriate to choose a road for a truck containing explosive materials which travels along the route of an oil pipeline.

The invention as here described is not limited to the physical structure of a pollution plume. It could include any above or underground physical structure. It may include dynamic pollution, such as air pollution which moves over time.

Furthermore, as seen in the next example the invention is not limited to physical structures.

The invention can be expanded to manage institutional controls with respect to the use of air space above a physical property. With the addition of time as a fourth dimension the invention can be used to manage flights above the site. It is interesting to note that in this expansion there is no physical structure, but solely the concept of air space rights.

The invention can be used for national security tasks, such as analyzing the historic land use against certain profiles and provide an alert if there is a match.

The invention can be used for the due diligence process of any real estate transaction.

The invention can be used to manage assets, for example:
Such as private water wells. The owner uses the system to learn early of any activities which might diminish the value of his assets, in other words that are a threat to pollute his water or his ability to exploit the well;
Store property. For example, a store owner or store operator might want to know the change of traffic patterns, of available store space, new store leases, new openings, local demographic shifts in relationship to his store location, to optimize his business Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented apparatus for monitoring use of land, comprising:
a database comprising site description data of a site identified to be monitored in connection with one or more zones comprising any of a property management zone, an intrusion protection zone, and a resource zone, wherein said site comprises a specific geographic area, and wherein boundaries of said site do not necessarily align with boundaries of a legal description of a property;
wherein said data further comprise data which vary between different geographic locations within said site, and said at least one land use restriction;
said database further comprising alert criteria which specify when an alert should be generated based upon detection of land use violation;
a computer executable logic module configured for regularly monitoring on going land use activities in connection with said site in view of at least one land use restriction which limits how said site can be used, and for maintaining data said database that are generated as a result of said monitoring by said logic module, wherein said data related to land use activities in conjunction with a particular geographic location of said site are any of automatically generated and provided by third parties;
said logic module further configured for monitoring land use activities at said different locations within said site and configured for detecting at least one specific land use activity that violates said at least one land use restriction within said one or more zones;
said logic module further configured for detecting violation of said at least one of said land use restrictions within said one or more zones by matching said alert criteria to said data resulting from said monitoring of one of said different geographic locations within said site; and
said logic module further configured for generating and providing an alert if a land use violation is detected at-least one of said different geographic locations within said site within a zone associated with said site that matches said alert criteria.

2. The apparatus of claim 1, wherein said logic module assembles said activity data into a shape file which expands across a specific geographic area.

3. The apparatus of claim 2, further comprising:
means for translating said activity data into said shape file; and
means for comparing geographic areas represented by said activity data and said shape file to each other to determine and search for any area overlaps, wherein if there is an overlap, said logic module prepares and sends an alert.

4. The apparatus of claim 1, wherein said site description data comprise any of:
location of said site, wherein said location is described in any of longitude/latitude parameters, parcel number, street address, grid based mapping location, and/or altitude or elevation;
a detailed description of elements of interest;
a graphical description;
contact names and addresses;
a description of said institutional control;
pictures or other visual elements.

5. The apparatus of claim 1, said site comprising:
a plurality of zones, wherein a different monitoring and/or alert procedure can be provided for each zone.

6. The apparatus of claim 1, said database further comprising a plurality of IC rules, wherein said IC rules describe restriction and alert procedures which comprise any of:
different restrictions specified for each of a plurality of zones;
elements and frequency of monitoring the land use; and
rules for alerting one or multiple parties regarding any violations or conflicts with said IC rules.

7. The apparatus of claim 1, wherein said land use activity data comprises data related to a geographic location of said site and which varies between different locations.

8. The apparatus of claim 1, wherein said land use activity data comprises any of:
real estate data which comprises any of sales, zoning, current use, tenant, and rent rates;
water well related data;
building permit data or application data;
EPA data;
requests for excavation, as well as excavation permits;
land use related data;
chemical spill data;
school, education data;
political representation data;
traffic data;
socio-demographic data which comprises any of income, age, race, and education;
commercial data which comprises any of type of business, sales, and industry;
crime rates;
sex offender data;
any of noise, air, and climate data;

any of health data, death rates and causes; and real time data provided by sensors, wherein said sensors comprises any device that is capable of capturing a real time physical activity.

9. The apparatus of claim 1, wherein said activity data does not initially exist as data, but is generated using other data and/or other activity data sets and logic rules.

10. The apparatus of claim 1, wherein said activity data is collected using physical measuring instruments.

11. The apparatus of claim 1, wherein said logic module determines any of:

a shape area comprising a three-dimensional shape comprising any of longitude, latitude and altitude;

a shape area comprising a two-dimensional shape, where one dimension is altitude;

a virtual shape; and a shape area comprising time as a fourth dimension.

12. The apparatus of claim 11, said logic module comprising:

means for comparing multiple shapes against each other to search for overlaps.

13. The apparatus of claim 11, wherein said shape can be dynamic, and change according to logical rules, which may include any of a change in size; and/or a change in location.

14. The apparatus of claim 11, wherein any of a person and object comprises a shape owning a geographic location over time.

15. The apparatus of claim 11, wherein shapes can be merged and/or split apart.

16. The apparatus of claim 1, wherein alerts comprise any of an electronic or printed format;

wherein one or multiple parties can be alerted;

wherein logic rules may be optionally provided outlining an escalation path for the alert mechanism; and wherein an alert can be driven or initiated based on a specified time sequence of events.

17. The apparatus of claim 1, further comprising:

an alert logic module for executing steps to verify an alert, wherein such steps comprise any of:

checking against other data sources to check plausibility or seriousness;

requesting from one or more systems additional information needed for evaluation; and means for including manual operator input.

18. The apparatus of claim 1, further comprising:

an action module for receiving an alert and for creating corrective action steps based on said alert, wherein a corrective action is any activity which is not an alert or an evaluation of an alert.

19. The apparatus of claim 18, wherein said corrective action comprises any of:

an automated letter of complaint;

a warning to a party having caused an alert to stop certain activities or introduce activities; and a legal disclosure letter to a purchaser of a property next to said site to make sure that the new owner is aware of certain land use restrictions.

\* \* \* \* \*